Patented Dec. 1, 1953

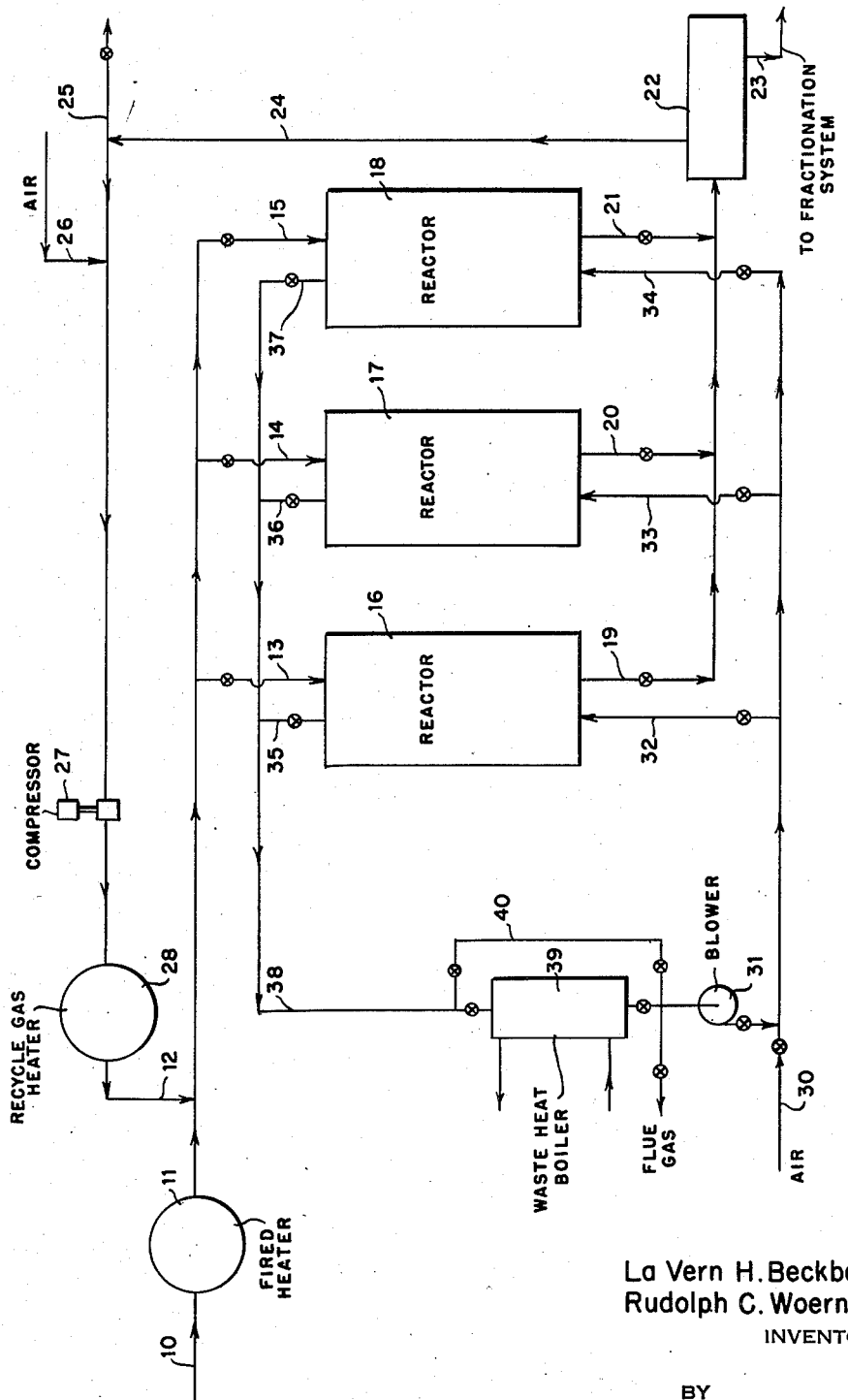

2,661,383

UNITED STATES PATENT OFFICE 2,661,383

PROCESS

La Vern H. Beckberger, East Chicago, Ind., and Rudolph C. Woerner, Houston, Tex., assignors to Sinclair Refining Company, New York, N. Y., a corporation of Maine Application July 14, 1951, Serial No. 236,791

4 Claims. (Cl. 260—673.5)

Our invention relates to the production of aromatics from straight run, close-cut petroleum fractions boiling within the gasoline range and particularly relates to the production of benzene from straight run $C_6$ petroleum hydrocarbon fractions.

The process is conducted in the presence of a catalyst comprising molybdenum oxide-alumina-silica and in the presence of a partial pressure of hydrogen under typical conditions represented by a temperature range of about 850° to 1000° F., a pressure of from atmospheric to about 250 p. s. i. g., a space velocity of about 0.15 to 2.0 and a molar ratio of hydrogen to hydrocarbon feed between about 2/1 and 8/1. We have discovered that the introduction of a very small amount of oxygen with the hydrogen supplied to the reaction zone results in a surprising increase in the yield of total recoverable liquid products and a surprising specific improvement in yield of benzene.

Our invention therefore contemplates processing a straight run $C_6$ petroleum hydrocarbon fraction by contacting it in the presence of a molybdenum oxide-alumina-silica catalyst and a hydrogen containing gas stream usually representing recycle gases from the reaction zone under conditions of about 850° to 1000° F. from atmospheric pressure to about 250 p. s. i. g. at a liquid hourly space velocity of 0.15 to 2.0 and with a molar ratio of hydrogen to hydrocarbon feed of about 2/1 to 8/1 while adding about 0.001 to 0.2% of oxygen to the hydrogen-containing gas stream. The oxygen may be added in the form of air or as pure oxygen. There appears to be no distinction in terms of result except that the use of pure oxygen avoids the build-up of nitrogen in the recycle gases. We have found that even traces of oxygen in the recycle hydrogen gas stream effects improvement in yield and that the improvement appears to increase in linear fashion with the addition of oxygen up to about 0.1%, or about 0.5% air, where the rate of improvement levels off. The improvement is obtained however up to about 0.2% oxygen or about 1.0% air. Larger quantities are undesirable.

The process is carried out by prefractionating a selected straight run naphtha containing a desirable proportion of naphthenes to obtain a fraction boiling approximately over the range of 140° to 185° F. The fraction is preheated to reaction temperature and advantageously contacted with catalyst by passage through a fixed bed of the catalyst in pelleted or granular form. The effluent from the reaction zone is passed to a liquid-gas separator, gases are separated for recycle and the liquid products are treated by conventional fractionation procedures to recover benzene. The non-benzene liquid products can be treated for recovery of other aromatics, such as toluene, xylene or the entire residue can be employed as an aviation gasoline blending stock. Also the residue or portions thereof may be recycled if desired.

Since the process produces coke which tends to deactivate the catalyst, it is necessary to cyclically regenerate the catalyst by burning off the coke with air. For this reason, a plurality of reactors connected in parallel is advantageously employed so that at least one reactor is on-stream continuously. The heat of regeneration advantageously is employed to compensate for the exothermic heat of the reaction by packing the reactor with a mixture of high heat capacity, inert solid particles, e. g. tabular alumina or alundum pellets. Thus the heat of regeneration is taken up in part by the inert material and stored for release during the oil processing stage.

The catalyst employed is the well known molybdenum oxide alumina reforming catalyst which contains about 5 weight per cent of silica as a stabilizer and promoter. The catalyst is available commercially from the Harshaw Chemical Company under the designation Mo 0201. A typical analysis of the preferred catalyst comprises: $Al_2O_3=83.80\%$, $MoO_2=10.14$, $SiO_2=5.04$, volatile matter=12.8% at 1600° F., volatile matter=4.5% at 900° F. and carbon=1.80. Surprisingly, the commercially available and otherwise comparable molybdenum oxide-alumina-reforming catalysts which contain no silica or only traces of silica do not respond to the use of oxygen in the recycle hydrogen gas stream.

The best conditions for operating the process depend somewhat upon the nature of the feed stock. With higher proportions of naphthenes boiling in the $C_6$ range relatively milder processing conditions are imposed for best yields. We have found, however, that yields are much less dependent upon hydrogen partial pressure and hydrocarbon partial pressure than would be expected. Total pressure appears to be more important and a rather sharp peak in plotting benzene yield against total pressure is observed in the region of 50 p. s. i. g.

Our invention will be further described by reference to the accompanying drawing which represents a simplified flow plan of the process. The prefractionated hydrocarbon feed is charged to the system through line 10 after preheating in fired heater 11 to about 850° to 1000° F. The hot recycle gas stream from line 12 is admixed with the vaporized feed, and the mixture is passed by one of the valved connections 13, 14 or 15 to one of the reactors 16, 17 or 18. Each of the reactors is packed with a diluted catalyst bed containing a mixture of tableted or granular alumina and tableted or pelleted catalyst in a proportion of about 2 to one. The effluent from the onstream reactor is passed continuously by one of the valved connections 19, 20 or 21 to separator 22. Liquid products are removed from the separator 22 by means of line 23 and passed to the usual fractionation system for recovery of benzene. Gases separated in separator 22 are recycled to the system by means of line 24. Excess recycle gas can be bled off the system by means of valved connection 25. Air or oxygen in the desired small quantities is admitted to line 24 by means of connection 26. The recycle gas stream is recompressed to the reactor pressure by means of compressor 27 and pass through recycle gas heater 28 before admixture with the feed in line 10.

While one of the reactors is onstream, the remaining reactors are purged by passage of flue gas or an inert gas stream and then are regenerated by passage of air over the catalyst bed to burn off the carbon deposited on the surfaces of the catalyst particles. As indicated in the drawing, regeneration air is introduced to the system by means of connection 30 and is diluted with recycled flue gas supplied from blower 31. The regenerating gas mixture is admitted to one of the reactors 16, 17 and 18 by means of one of valved connections 32, 33 or 34. Flue gases are removed from the reactors by one of the valved connections 35, 36 or 37 and passed by means of line 38 through waste heat boiler 39 for recovery of excess heat of regeneration in the form of steam. By-pass 40 is provided around waste heat boiler 39 in order to provide temperature control in the recycling purge gas stream or the regeneration gas stream. The cycle timing depends upon the nature of the feed and the processing conditions but ordinarily contemplates about 10 to 30 minutes' reaction time and about 10 to 25 minutes' regeneration time with the over-all cycle balanced by a period of purge preceding and following the regeneration cycle. It may be desirable however to provide separate regenerating gas and purge gas systems.

A typical operating example for a 3,000-barrel per day unit is as follows. Four cases processing all of the time with a 40-minute process period, and a 10-minute regeneration period in a 60-minute cycle is employed. The conditions are 875° F., 50 p. s. i. g., 0.166 space velocity and 6 to 1 hydrogen recycle ratio for a feed stock comprising a 73° API, 140° to 185° F. cut from a straight run Mid-Continent naphtha. Under these conditions, liquid recovery ($C_{4+}$) is 82.5 weight per cent on the feed, gas ($C_{4-}$) is 14.6% and coke is 2.9%. The benzene yield is 26 weight per cent on the feed, and the yield of high octane gasoline is 56.5 weight per cent. The carbon laydown is 2.2 grams per liter over 40 minutes while the allowable burn-off in 10 minutes is 7 grams per liter.

The advantage of employing oxygen in the hydrogen recycle gas stream is illustrated in the following data which have been tabulated from comparable test runs showing the use of pure hydrogen, the use of traces of air in the hydrogen supply and the use of 0.5 air by volume in the hydrogen supply.

| Hydrogen supply | Pure hydrogen | | Trace of air | | 0.5% air by vol. | |
|---|---|---|---|---|---|---|
| Catalyst | Regenerated molybdenum oxide on alumina (containing 5% silica) | | Regenerated molybdenum oxide on alumina (containing 5% silica) | | Regenerated molybdenum oxide on alumina (containing 5% silica) | |
| Test conditions: | | | | | | |
| Temp., °F | 923 | 927 | 929 | 926 | 928 | 929 |
| Pressure lbs | 490 | 490 | 490 | 490 | 490 | 490 |
| $H_2$/HC molal | 12.8 | 12.3 | 12.9 | 13.9 | 13.4 | 13.8 |
| L. S. V | .50 | .523 | .51 | .49 | .50 | .477 |
| Liquid recovery, wt. percent | 58.2 | 40.3 | 74.0 | 75.2 | 82.0 | 80.0 |
| Recovery, wt. percent, average | 49.3 | | 74.6 | | 81.0 | |
| Wt. percent benzene per pass | 6.9 | 4.8 | 11.2 | 10.7 | 13.6 | 12.4 |
| Wt. percent benzene per pass, average | 5.85 | | 10.95 | | 13.0 | |

We claim:

1. In a process for producing benzene from a straight run $C_6$ cut petroleum hydrocarbon fraction in the presence of a molybdenum oxide reforming catalyst on alumina base containing a stabilizing proportion of silica and in the presence of a hydrogen containing gas stream under conditions of about 850° to 1000° F., atmospheric pressure to about 250 p. s. i. g., about 0.15 to 2.0 liquid hourly space velocity and a molar ratio of hydrogen to hydrocarbon feed of about 2/1 to 8/1, the step of adding oxygen to the hydrogen containing gas stream in a proportion of about 0.001 to 0.2% by volume of said gas stream.

2. The process of claim 1 in which the oxygen is added as air.

3. The process of claim 1 in which the percentage of oxygen added approximates 0.1% by volume based on the hydrogen containing gas stream.

4. The process of claim 1 in which the pressure is maintained at about 50 p. s. i. g.

LA VERN H. BECKBERGER.
RUDOLPH C. WOERNER.

References Cited in the file of this patent

UNITED STATES PATENTS

| Number | Name | Date |
|---|---|---|
| 2,362,196 | Frey | Nov. 7, 1944 |
| 2,437,531 | Huffman | Mar. 9, 1948 |